(12) United States Patent
Chung et al.

(10) Patent No.: US 9,467,830 B2
(45) Date of Patent: Oct. 11, 2016

(54) ELECTRONIC DEVICE AND METHOD FOR SHARING CONTENT THEREOF

(71) Applicant: Samsung Electronics Co., Ltd., Gyeonggi-do (KR)

(72) Inventors: Jinkyo Chung, Seoul (KR); Zion Kwon, Seoul (KR); Hyewon Kim, Seoul (KR); Ho Kim, Seoul (KR); Jungeui Seo, Gyeonggi-do (KR); Changmo Yang, Gyeonggi-do (KR); Hayoung Jeon, Seoul (KR); Bonghak Choi, Gyeonggi-do (KR); Joonhyuk Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/752,011

(22) Filed: Jun. 26, 2015

(65) Prior Publication Data
US 2015/0382164 A1  Dec. 31, 2015

(30) Foreign Application Priority Data

Jun. 27, 2014  (KR) .................. 10-2014-0079545

(51) Int. Cl.
*H04M 3/42*  (2006.01)
*H04W 4/16*  (2009.01)

(52) U.S. Cl.
CPC ..................... *H04W 4/16* (2013.01)

(58) Field of Classification Search
CPC ........................................ H04W 4/16

USPC .............. 455/412.1–414.2, 416, 418–422.1, 455/456.1, 566, 466, 41.1–42.1; 370/338, 370/228
See application file for complete search history.

(56) References Cited

U.S. PATENT DOCUMENTS

| | | | |
|---|---|---|---|
| 2005/0114646 A1 | 5/2005 | Rekimoto et al. | |
| 2006/0095515 A1* | 5/2006 | Forstadius | G06F 17/30905 709/205 |
| 2007/0100839 A1* | 5/2007 | Kim | G06F 17/30053 |
| 2009/0055480 A1* | 2/2009 | Choi | H04L 67/104 709/205 |
| 2010/0080361 A1* | 4/2010 | Houghton | H04M 3/307 379/87 |
| 2010/0083137 A1* | 4/2010 | Shin | H04L 12/1822 715/756 |
| 2011/0273526 A1 | 11/2011 | Mehin et al. | |
| 2012/0021682 A1* | 1/2012 | Tabaaloute | H04L 12/2812 455/41.1 |
| 2013/0267172 A1* | 10/2013 | Ko | H04B 5/0031 455/41.1 |
| 2013/0336341 A1 | 12/2013 | Kamada | |
| 2014/0059707 A1* | 2/2014 | Cho | H04W 12/08 726/29 |

* cited by examiner

*Primary Examiner* — Babar Sarwar
(74) *Attorney, Agent, or Firm* — The Farrell Law Firm, P.C.

(57) ABSTRACT

Disclosed is method for sharing the content of a first electronic device, including transmitting, when connecting a call with a second electronic device using a first network, a notification on the call connection to a third electronic device that is connected with a second network, and transmitting, when the content related to the notification is received from the third electronic device during the call, the received content to the second electronic device.

21 Claims, 9 Drawing Sheets

ELECTRONIC DEVICE AND METHOD FOR SHARING CONTENT THEREOF

PRIORITY

This application claims priority under 35 U.S.C. §119(a) to Korean Patent Application No. 10-2014-0079545, filed in the Korean Intellectual Property Office on Jun. 27, 2014, the contents of which are incorporated herein by reference.

BACKGROUND OF THE INVENTION

1. Field of the Invention

The present invention relates generally to an electronic device, and more particularly, to a method for sharing content between electronic devices.

2. Description of the Related Art

The development of integration technology and communication technology has provided a variety of electronic devices for satisfying various user demands. For example, early-model mobile phones have been replaced with smart phones and tablet Personal Computers (PCs) that are highly portable and usable. In addition, laptop PCs and home appliances such as smart Television (TV) sets have been further developed.

As such, there is a need for technology that ensures sharing and continuity of tasks between electronic devices.

For example, a phone is generally held at a user's ear when the user makes a call using a smart phone. Even though the smart phone provides a function to execute various applications during the call, current technology makes it very inconvenient for the user to search for information related to the call and to share the searched information with the recipient.

SUMMARY OF THE INVENTION

The present invention has been made to address at least the problems and/or disadvantages described above and to provide at least the advantages described below.

Accordingly, an aspect of the present invention provides technology in which the user can share the content related to the call with the recipient during the call through the electronic device, using a separate electronic device.

In accordance with an aspect of the present invention, a method for sharing the content of an electronic device includes transmitting, when connecting a call with a second electronic device using a first network, a notification on the call connection to a third electronic device that is connected with a second network, and transmitting, when the content related to the notification is received from the third electronic device during the call, the received content to the second electronic device.

In accordance with another aspect of the present invention, a method for sharing the content of an electronic device includes receiving a notification on a call connection of a second electronic device from the second electronic device through a configured network, displaying a content sharing window related to the received notification, uploading the content into the content sharing window according to a user input, and transmitting the content uploaded in the content sharing window to the second electronic device through the network.

In accordance with another aspect of the present invention, a first electronic device includes a communication interface that makes a connection with a second electronic device through a first network and makes a connection with a third electronic device through a second network, and a connection control module that transmits, when connecting a call with the second electronic device using the first network, a notification on the call connection to the third electronic device that is connected with the second network, and that transmits, when the content related to the notification is received from the third electronic device during the call, the received content to the second electronic device.

In accordance with another aspect of the present invention, a first electronic device includes a communication interface that connects the first electronic device to a second electronic device through a configured network, a content sharing control module that makes a control to receive a notification on a call connection of the second electronic device from the second electronic device through the network, display a content sharing window related to the received notification, upload the content into the content sharing window according to a user input, and transmit the content uploaded in the content sharing window to the second electronic device through the network, and a display that displays the content sharing window and the content.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
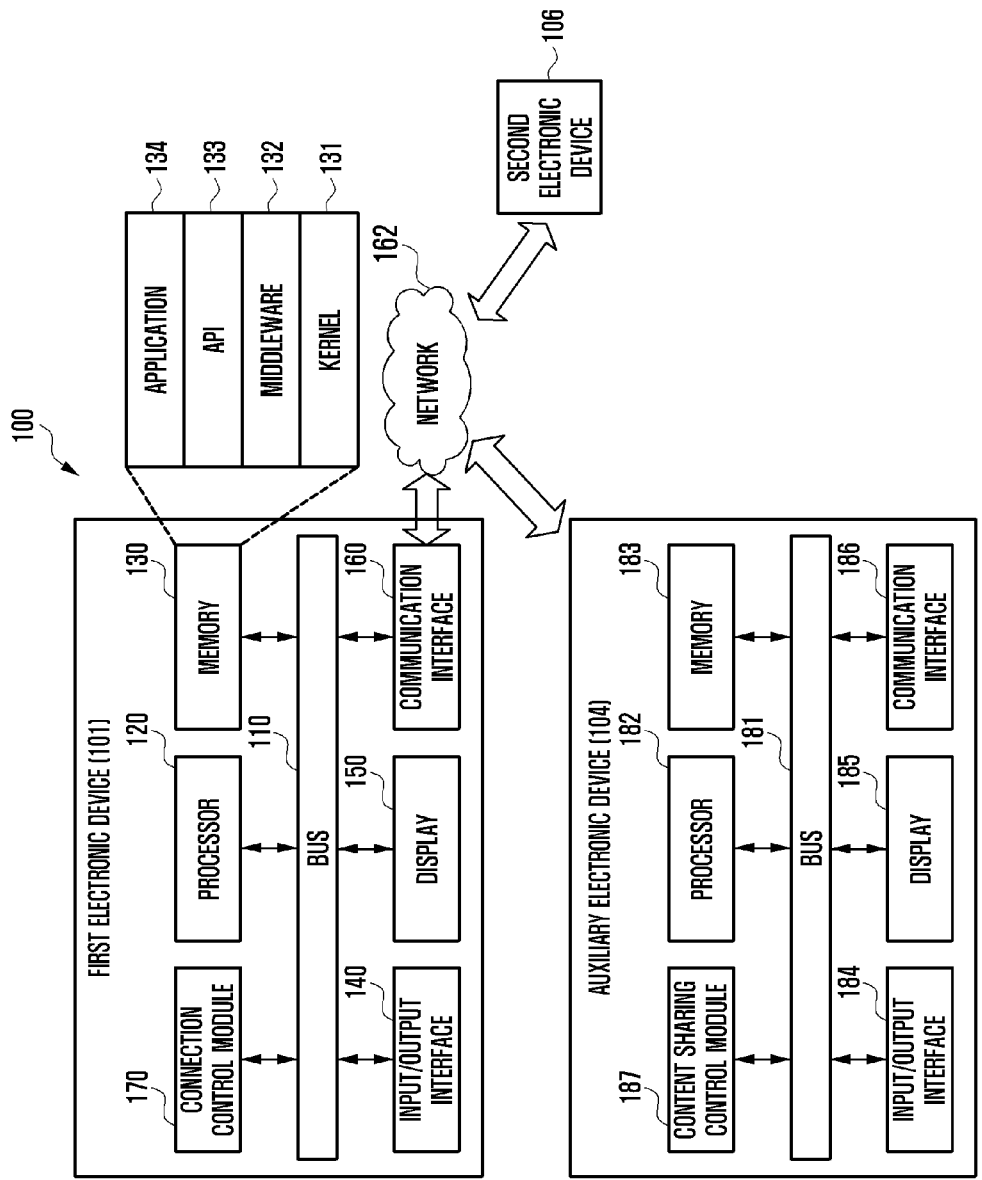
FIG. 1 illustrates a network environment between electronic devices according to an embodiment of the present invention.

Hereinafter, the present invention will be described with reference to the accompanying drawings. The present invention may have various embodiments, and modifications and changes may be made therein. It should be understood that there is no intent to limit the present invention to the particular forms, and the present invention should be construed to cover all modifications, equivalents, and/or alternatives falling within the spirit and scope of the present invention. In describing the drawings, similar elements are designated by similar reference numerals. In the following description, well-known functions or constructions are not described in detail since they would obscure the invention in unnecessary detail.

As used in the present disclosure, the expressions "include" or "includes" refer to the existence of a corresponding function, operation, or constituent element, and do not limit one or more additional functions, operations, or constituent elements. As used in the present disclosure, terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" includes A, includes B, or includes both A and B.

While expressions including ordinal numbers, such as "first" and "second" as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. A first constituent element may be referred to as a second constituent element, and likewise a second constituent element may also be referred to as a first constituent element without departing from the scope of the present invention.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used to describe various embodiments of the present invention are merely for the purpose of describing particular embodiments and are not intended to limit the present invention. Singular forms are intended to include plural forms unless the context clearly indicates otherwise.

Unless defined otherwise, all terms used herein, including technical terms and scientific terms, have the same meaning as commonly understood by a person of ordinary skill in the art to which the present invention pertains. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to the present invention may be a device including a communication function, such as a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function, such as a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic devices include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to some embodiments, the electronic device include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present invention may be a combination of one or more of the aforementioned various devices, and may be a flexible device. It will be apparent to those skilled in the art that the electronic device according to the present invention is not limited to the aforementioned devices.

The term "a user" as used in various embodiments may refer to any person who uses an electronic device or any other device (e.g., an artificial intelligence electronic device) using an electronic device.

In a method for sharing content of an electronic device according to the present invention, the user can share the content related to a call with a recipient during the call through an electronic device, using a separate electronic device.

In the present invention, even in an electronic device has no communication network function, when the electronic device is connected with another electronic device which is in the middle of a call through a predetermined network, the another electronic device can transmit the content to the electronic device of the recipient.

FIG. 1 illustrates a network environment 100 including an electronic device 101 according to various embodiments of the present invention. Referring to FIG. 1, a plurality of electronic devices described in various embodiments of the present invention is divided into the first electronic device 101, the second electronic device 106, and the auxiliary electronic device 104 according to a function thereof for convenience of explanation. In addition, it will be obvious to those skilled in the art to understand that the first electronic device 101 operate as the second electronic device 106 or the auxiliary electronic device 104, and vice versa.

Referring to FIG. 1, the electronic device 101 includes a bus 110, a processor 120, a memory 130, an input/output interface 140, a display 150, a communication interface 160, and a connection control module 170.

The bus 110 is a circuit interconnecting the aforementioned components and transmitting communication (e.g., a control message) between the aforementioned components.

The processor 120, for example, receives instructions from the aforementioned components other than the processor 120 through the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the connection control module 170). The memory 130 includes programming modules, including a kernel 131, middleware 132, an application programming interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the other programming modules and provides an interface that allows the middleware 132, the API 133, or the applications 134 to access and control or manage individual components of the electronic device 101.

The middleware 132 serves to mediate between the API 133 or the applications 134 and the kernel 131, that is, allows the API 133 or the application 134 to communicate and exchange data with the kernel 131. The middleware 132 performs control (e.g., scheduling or load balancing) for task requests received from the applications 134 by using, for example, a method of assigning a priority for use of the system resource of the electronic device 101 to at least one of the applications 134.

The API 133 allows the applications 134 to control functions provided by the kernel 131 and the middleware 132, and includes at least one interface or function (e.g., instruction) for file control, window control, image processing, text control, etc.

According to various embodiments, the applications 134 include Short Message Service/Multimedia Messaging Service (SMS/MMS), e-mail, calendar, alarm, health care (e.g., for measuring the amount of exercise or blood glucose), and environmental information applications (e.g., for providing atmospheric pressure information, humidity information, and temperature information). Additionally or alternatively, the applications 134 include an application associated with information exchange between the electronic device 101 and an external electronic device (e.g., the second electronic device 106 or the auxiliary electronic device 104). The application associated with information exchange, for example, includes a notification relay application for transferring specific information to the external electronic device or a device management application for managing the external electronic device.

For example, the notification relay application includes a function of transferring notification information, generated in another application of the electronic device 101 (e.g., the SMS/MMS, e-mail, health care, or environmental information application), to an external electronic device. The notification relay application, for example, receives notification information from an external electronic device and provides the received notification information to a user. The device management application, for example, manages a function for at least a part of an external electronic device communicating with the electronic device 101 (e.g., turning on/off an external electronic device or adjusting the brightness of a display), an application running on the external electronic device, or a service provided in the external electronic device.

According to various embodiments, the applications 134 include an application specified according to the attribute (e.g., type) of an external electronic device. For example, when the external electronic device is an MP3 player, the applications 134 include an application associated with music playback. Similarly, when the external electronic device is a mobile medical device, the applications 134 include an application associated with health care. According to an embodiment, the applications 134 include at least one of an application assigned to the electronic device 101 and an application received from an external electronic device.

The input/output interface 140, for example, transfers instructions or data, input from a user through an input/output device such as a sensor, a keyboard, or a touch screen, to the processor 120, the memory 130, the communication interface 160, or the connection control module 170 through the bus 110. For example, the input/output interface 140 provides the processor 120 with data corresponding to a user's touch input through a touch screen. The input/output interface 140, for example, receives instructions or data from the processor 120, the memory 130, the communication interface 160, or the connection control module 170 through the bus 110 and outputs the received instructions or data through the input/output device. For example, the input/output interface 140 outputs voice data processed by the processor 120 to a user through a speaker.

The display 150 displays various pieces of information to a user.

The communication interface 160 establishes communication between the electronic device 101 and an external electronic device. For example, the communication interface 160 may be connected to the network 162 through wireless or wired communication and thereby communicate with the external device. The wireless communication, for example, includes at least one of Wireless Fidelity (WiFi), Bluetooth® (BT), near field communication (NFC), a global positioning system (GPS), and cellular communication (e.g., LTE, LTE-A, CDMA, CDMA, UMTS, WiBro, or GSM). The wired communication, for example, includes at least one of a universal serial bus (USB), a high definition multimedia interface (HDMI), recommended standard 232 (RS-232), and a plain old telephone service (POTS).

According to an embodiment, the network 162 may be a telecommunications network including at least one of a computer network, the Internet, the Internet of Things (JOT), and a telephone network. A protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

When the first electronic device 101 makes a call-connection with the second electronic device 106 through a communication network, the connection control module 170 transmits a notification related the call to the auxiliary electronic device 104 that is connected with a predetermined network. According to an embodiment, a network connection format with the auxiliary electronic device 104 may be configured in the first electronic device 101, which transmits the notification on the call based on the configured network.

The operation of connecting calls between the first electronic device 101 and the second electronic device 106 includes at least one of when a call is received from the second electronic device 106, transmitted to the second electronic device 106, or connected between the first electronic device 101 and the second electronic device 106.

According to an embodiment of the present invention, when the user makes a call to the second electronic device 106 using the first electronic device 101, e.g., a smart phone, the first electronic device 101 transmits a notification on the call to the auxiliary electronic device 104 such as, for example, a tablet PC. The first electronic device 101 determines whether the user of the second electronic device 106 is stored in contact information, and if the user is stored in the contact information, the first electronic device 101 transmits the notification to the auxiliary electronic device 104.

The auxiliary electronic device 104 may belong to the area in which the auxiliary electronic device is available for the user so that the user may execute a function, such as searching for the content, using the auxiliary electronic device 104 while the call is in progress through the first electronic device 101. The first electronic device 101 and the auxiliary electronic device 104 may be connected with each other through various wired/wireless networks such as short-range networks, WiFi, or Bluetooth®. The auxiliary electronic device 104, which has received the notification, displays a content sharing window, and when the content is uploaded into the content sharing window, the auxiliary electronic device 104 transmits the uploaded content to the first electronic device 101.

In transmitting the notification, the connection control module 170 transmits call information including at least one of recipient, call connection, call duration, and related application information to the auxiliary electronic device 104. The recipient information includes user information of the second electronic device 106, such as a name, photo, or phone number, which is stored in the contact information of the first electronic device 101. The call connection information indicates whether a call is incoming, outgoing, or in progress, for example. The call duration information may relate to the elapsed time after a call is connected. The related application information may refer to applications related a call, such as those that have been preliminarily configured by the user in relation to the recipient.

When the connection control module 170 receives the content related to the notification from the auxiliary electronic device 104 during a call with the second electronic device 106, the connection control module 170 transmits the received content to the second electronic device 106. For example, the received content is transmitted through the connected network or another network, in the form of a multimedia messaging service. The content includes various types of data such as still images, music, voices, and videos.

Referring to FIG. 1, the auxiliary electronic device 104 includes a bus 181, a processor 182, a memory 183, an input/output interface 184, a display 185, a communication interface 186, and the content sharing control module 187.

The bus 181, the processor 182, the memory 183, the input/output interface 184, and the display 185 of the auxiliary electronic device 104 operate in a manner similar to the elements of the first electronic device 101.

The communication interface 186 connects communication between the auxiliary electronic device 104 and an external device (e.g., the first electronic device 101). For example, the communication interface 186 may be connected with the network 162 through wired communication or wireless communication to communicate with the external device. The wireless communication, for example, includes at least one of WiFi, Bluetooth® (BT), near field communication (NFC), a global positioning system (GPS), or cellular communication (e.g., long-term evolution (LTE), LTE-advanced (LTE-A), code division multiple access (CDMA), wideband CDMA (WCDMA), universal mobile telecommunications system (UMTS), WiBro, or global system for mobile communications (GSM)). The wired communication, for example, may at least one of a universal serial bus (USB), a high definition multimedia interface (HDMI), recommended standard-232 (RS-232), or POTS. According to an embodiment of the present invention, the communication interface 186 of the auxiliary electronic device 104, for example, does not adopt a communication network function, such as tablet or laptop PCs.

The content sharing control module 187 receives a notification on a call connection with the second electronic device 106 from the first electronic device 101 through a configured network. The content sharing control module 187 displays a content sharing window related to the notification on the display 185. When the content is uploaded into the content sharing window according to a user input, the content sharing control module 187 transmits the uploaded content, as the content related to the received notification, to the first electronic device 101. Such a content sharing function may be performed while the call between the first electronic device 101 and the second electronic device 106 is maintained. For example, when the call is terminated, the content sharing function through the content sharing window may be deactivated.

According to an embodiment, the content sharing control module 187 receives call information including at least one of recipient, call connection, call duration, or related application information as well as the notification from the first electronic device 101. The content sharing control module 187 displays the call information in the content sharing window to allow the user to identify information related to the call through the auxiliary electronic device 104.

According to an embodiment, when the notification is received, the content sharing control module 187 displays an icon including the call information through the display 185. When the user activates the content sharing function, such as by selecting the icon, the content sharing window is displayed on the display 185.

According to various embodiments of the present invention, the content may be captured to be thereby uploaded into the content sharing window in an image file format, or may be uploaded into the content sharing window in the original application file format, which executes the content. The upload format may be determined by a user manipulation.

Figure 2:
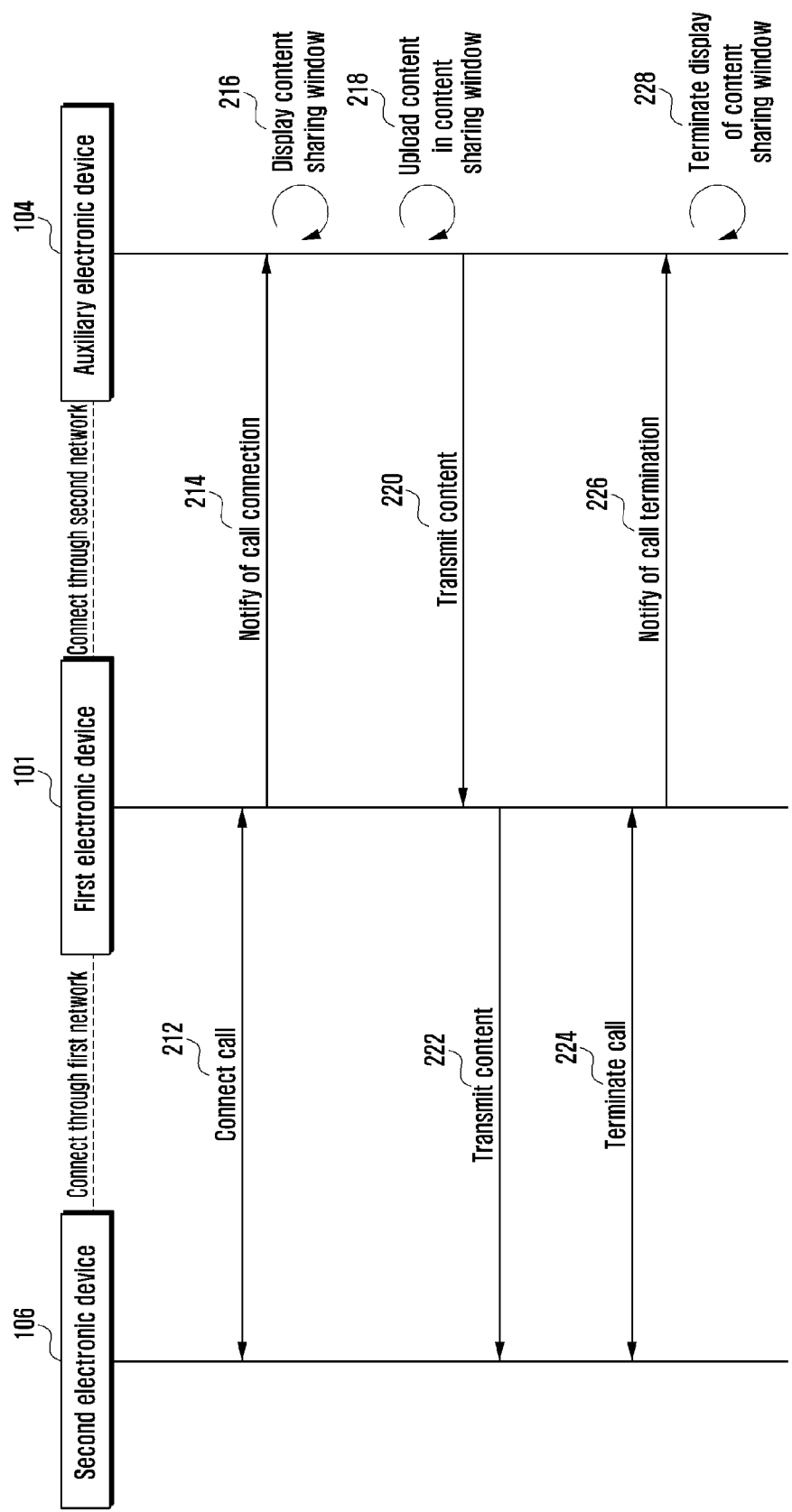
FIG. 2 is a flow chart illustrating a method of sharing the content between electronic devices according to an embodiment of the present invention.

FIG. 2 is a flow chart illustrating a method of sharing the content between electronic devices 101, 104, and 106 according to an embodiment of the present invention.

In FIG. 2, the first electronic device 101 and the second electronic device 106 are connected with each other through the first network, and the first electronic device 101 and the auxiliary electronic device 104 are connected with each other through the second network. The first network and the second network may be the same network or different networks. According to an embodiment, the first network includes a communication network, and the second network does not include a communication network. The second network may include short-range networks.

Referring to FIG. 2, in step 212, a call connection between the first electronic device 101 and the second electronic device 106 is made. The call connection includes at least one of a call reception from the second electronic device 106, the transmission of a call to the second electronic device 106, or the connection of a call with the second electronic device 106, as set forth above.

In step 214, the first electronic device 101 transmits a notification on the call connection to the auxiliary electronic device 104. In an embodiment, the first electronic device 101 may further transmit call information including at least one of recipient, call connection, call duration, or related application information to the auxiliary electronic device 104. According to an embodiment, the first electronic device 101 determines whether the user of the second electronic device 106 is stored in contact information, and if the user is stored in the contact information, the first electronic device 101 transmits the notification and the call information to the auxiliary electronic device 104.

In step 216, the auxiliary electronic device 104 outputs a content sharing window in relation to the received notification. The content sharing window displays the call information allowing the user to identify information related to the call through the auxiliary electronic device 104. According to an embodiment, when the notification is received, the auxiliary electronic device 104 displays an icon including the call information. The content sharing window is displayed when the content sharing function is activated by selecting the icon by the user.

In step 218, the auxiliary electronic device 104 uploads the content into the content sharing window according to the manipulation of the user. The user may execute a desired application in the auxiliary electronic device 104, and may create the content from the executed application. In addition, the user may upload the created content into the content sharing window. The content may be captured to be thereby uploaded into the content sharing window in an image file format, or may be uploaded into the content sharing window in the original file format of the application that executes the content. The upload format is determined by a manipulation of the user.

In step 220, when the content is uploaded in the content sharing window, the auxiliary electronic device 104 transmits the uploaded content to the first electronic device 101 while maintaining the file format.

In step 222, the first electronic device 101 transmits the content received from the auxiliary electronic device 104 to the second electronic device 106 without an additional manipulation by the user with respect to the first electronic device 101, so that the content that has been uploaded in the auxiliary electronic device 104 may be shared with the second electronic device 106. According to an embodiment, the first electronic device 101 transmits the received content to the second electronic device 106 through a multimedia messaging service.

In step 224, the call between the first electronic device 101 and the second electronic device 106 is terminated. In step 226, the first electronic device 101 transmits a notification on the call termination to the auxiliary electronic device 104.

In step 228, when the notification on the call termination is received the auxiliary electronic device 104 closes the display of the content sharing window, thereby deactivating the content sharing function between the electronic devices. The content sharing function indicates that the content uploaded in the auxiliary electronic device 104 is shared with the first electronic device 101 and the second electronic device 106 through the first and the second networks. Alternatively, the content sharing function may be deactivated without terminating the display of the content sharing window. For example, when the notification on the call termination is received, the auxiliary electronic device 104 may deactivate the content upload function of the content sharing window.

According to various embodiments of the present invention, the display of the content sharing window may be closed by a user manipulation before the notification on the call termination is received. In this case, even though the call connection between the first electronic device 101 and the second electronic device 106 is in progress, the content sharing function through the auxiliary electronic device 104 is deactivated.

Figure 3A:
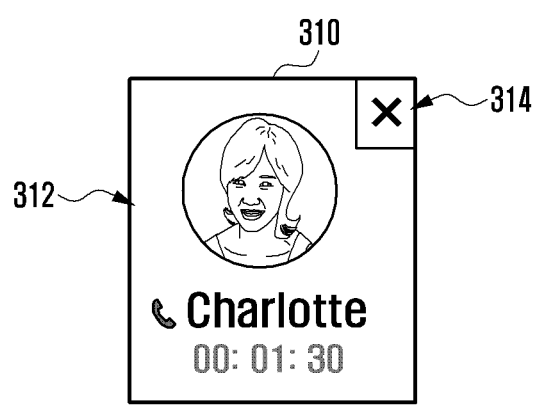
FIG. 3A illustrates a screen image of an icon displayed by an electronic device that has received a call notification, according to an embodiment of the present invention.

FIG. 3A illustrates a screen image of an icon 310 displayed by the auxiliary electronic device 104 that has received a notification on a call connection, according to an embodiment of the present invention.

According to an embodiment, the icon 310 is displayed in a predetermined area of the display in the auxiliary electronic device 104. The icon 310 includes an information area 312 and a close button area 314. The call information transmitted from the first electronic device 101 is displayed in the information area 312 so that the user may identify that the content sharing function related to a specific call connection is to be activated through the auxiliary electronic device 104. The information area 312 displays the name of a recipient, a photo, call connection information, or call duration information as the call information.

When the user makes an input with respect to the icon 310 in the information area 312, the auxiliary electronic device 104 displays the content sharing window through the display. If the user provides an input in the close button area 314 of the icon 310, the auxiliary electronic device 104 terminates the display of the icon 310 and deactivates the content sharing function related to the corresponding call. According to an embodiment, after the determination of the display of the icon 310, the icon 310 may be re-created.

Figure 3B:
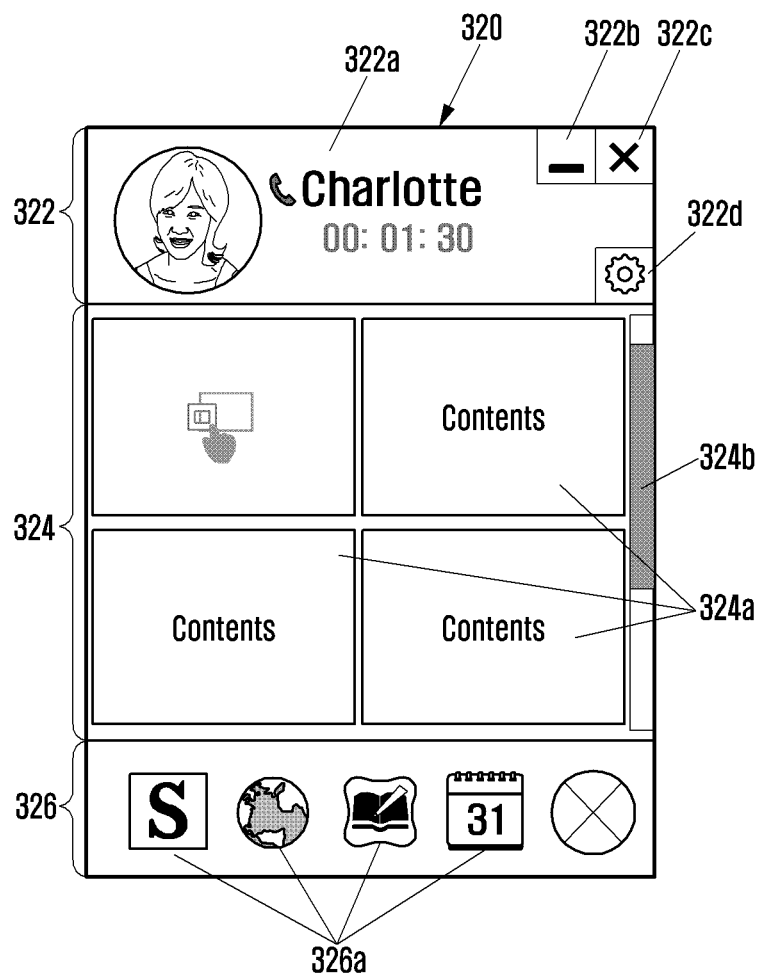
FIG. 3B illustrates a screen image of a content sharing window displayed by an electronic device that has received a call notification, according to an embodiment of the present invention.

FIG. 3B illustrates a screen image of a content sharing window 320 displayed by the auxiliary electronic device 104 that has received a notification on a call connection, according to an embodiment of the present invention.

In FIG. 3B, the content sharing window 320 is displayed in a predetermined area of the display in the auxiliary electronic device 104. The content sharing window 320 includes a call information display area 322, a content upload area 324, and a recommended application display area 326.

The call information transmitted from the first electronic device 101 is display in the call information display area 322, which includes an information display area 322*a*, a minimization button area 322*b*, a close button area 322*c*, and a setup button area 322*d*. For example, the information display area 322*a* displays the name of a recipient, a photo, call connection information, or call duration information as the call information.

When the user makes an input on the minimization button 322*b*, the content sharing window is minimized. When the user makes an input in the close button area 322*c*, the auxiliary electronic device 104 closes the display of the content sharing window 320 and deactivates the content sharing function related to the corresponding call connection. When the user makes an input in the setup button area 322*d*, the auxiliary electronic device 104 displays a setup menu related to the content sharing function, as will be described with reference to FIG. 7.

The content 324*a* uploaded by the user is displayed in sequence in the content upload area 324. For example, the latest content is displayed on the top, and previous content is arranged from the top to the bottom in sequence. The content upload area 324 is configured such that the user can identify all pieces of content in the corresponding area by using a scroll bar 324b.

The recommended application display area 326 includes one or more recommended applications 326a such as related application information included in the call information received from the first electronic device 101, applications configured by the auxiliary electronic device 104 based on the call information, and applications preliminarily configured in the auxiliary electronic device 104 by the user. According to an embodiment, the recommended applications 326a include a folder through which the content shared with the recipient may be accessed. When the user selects the folder, the content shared with the recipient is displayed on the display of the auxiliary electronic device 104. The shared content may be files that are stored in a server or are to be shared in the form of tags. The user may download the shared content displayed to the auxiliary electronic device 104, such as by a drag-and-drop input. The user uploads the shared content, which has been downloaded, into the content upload area 324.

According to an embodiment, when a user input into one of the recommended to applications 326a is received, the auxiliary electronic device 104 executes the corresponding application. The user may create the content from the executed application, and may upload the created content into the content upload area 324.

Figure 4:
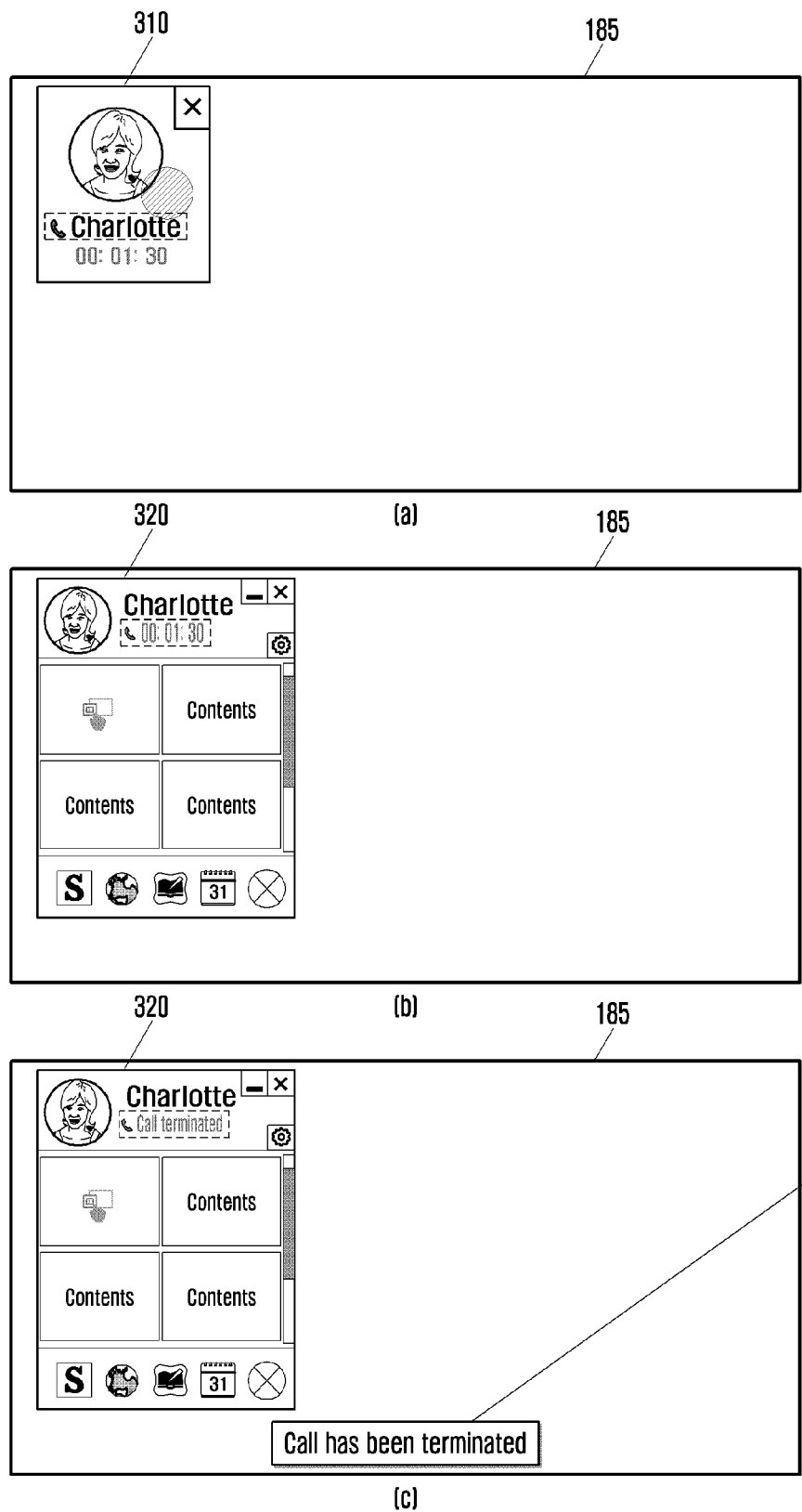
FIG. 4 illustrates screen images showing a method of creating a content sharing window in an electronic device that has received a call notification, according to an embodiment of the present invention.

FIG. 4 illustrates screen images showing a method of creating the content sharing window 320 in the auxiliary electronic device 104 that has received a notification on a call connection, according to an embodiment of the present invention.

Referring to screen image (a) of FIG. 4, when the notification on the call connection and the call information are received from the first electronic device 101, the auxiliary electronic device 104 displays the icon 310 including the call information in a predetermined area of the display 185.

When an input for selecting the icon 310 is received from the user, as shown in screen image (b) of FIG. 4, the content sharing window 320 is displayed in a predetermined area of the display 185 to replace the icon 310. The user uploads the content into the content upload area of the content sharing window 320. Although not illustrated, when an input for selecting the recommended application included in the recommended application display area is received, the auxiliary electronic device 104 may execute the corresponding application on the display. The user may create the content from the executed application, and may upload the created content into the content upload area.

When a notification on call termination is received from the first electronic device 101, as shown in screen image (c) of FIG. 4, the auxiliary electronic device 104 displays the call termination notification 410 through the display 185. The call information display area of the content sharing window 320 displays call termination information as the call connection information. According to an embodiment, the auxiliary electronic device 104 displays the call termination information and the call termination notification 410, and automatically closes the content sharing window 320.

Figure 5:
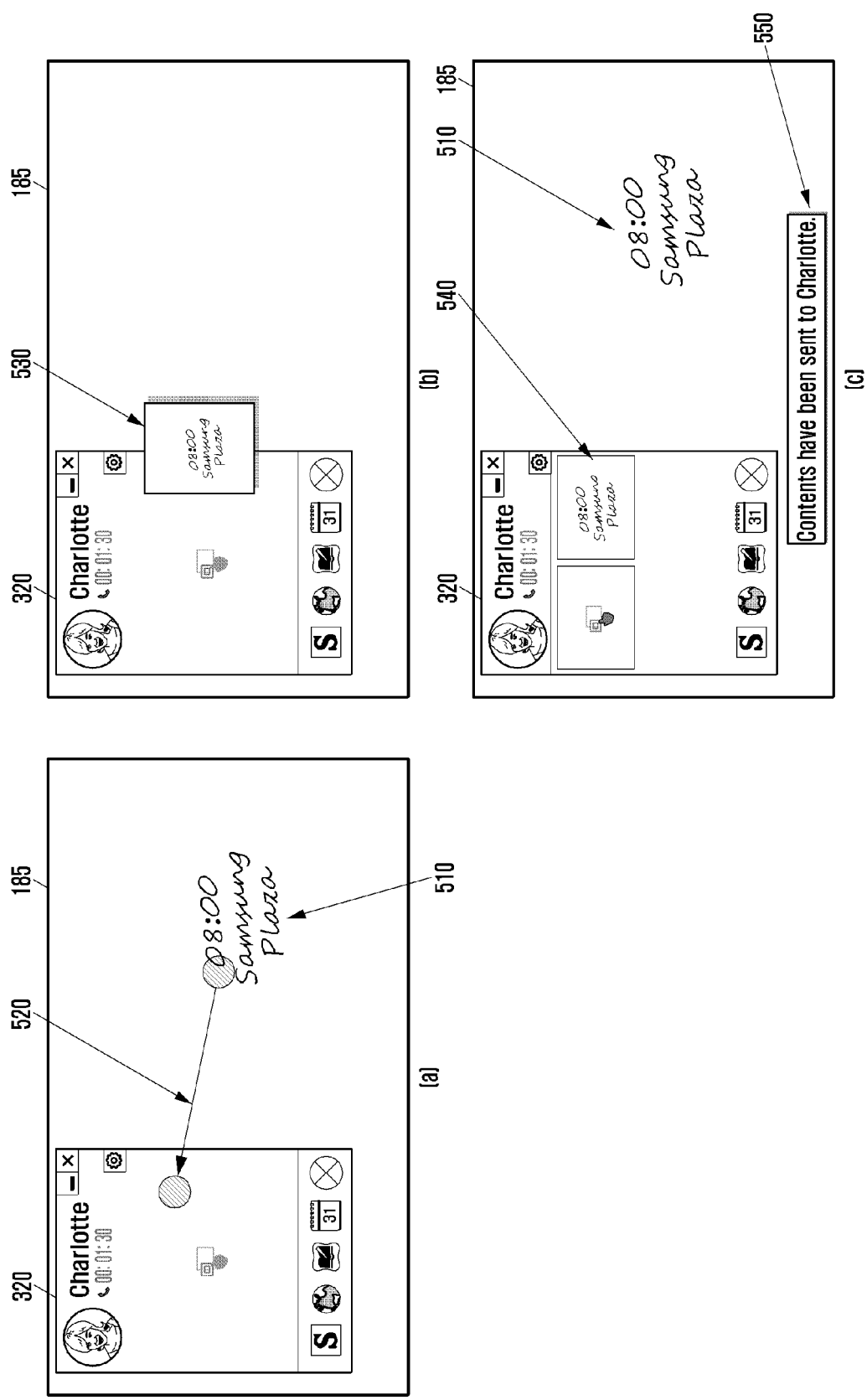
FIG. 5 illustrates screen images showing a method of uploading the content into a content sharing window, according to an embodiment of the present invention.

FIG. 5 illustrates screen images showing a method of uploading the content into the content sharing window 320, according to an embodiment of the present invention.

Referring to screen image (a) of FIG. 5, the user uploads the created content 510 into the content upload area of the content sharing window 320. For example, the user executes a memo application to create memo content 510, and uploads the corresponding memo content into the content upload area. The memo content may be captured and uploaded as an image file, or may be uploaded as an original memo application file, as determined by the uploading input method provided by the user. For example, if a long press on the memo content 510 is provided, the corresponding content is captured, and the captured image is uploaded into the content upload area by a subsequent drag input on the memo content 510.

When a touch input into the memo content 510 is received, the corresponding memo content is selected, and a subsequent drag input on the memo content 510 uploads the corresponding memo application as an original file format into the content upload area, and is provided to the user through a UI 530 as shown in screen image (b) of FIG. 5. When the uploading of the content is completed, the auxiliary electronic device 104 displays the uploaded content in the form of thumbnails 540 in the content upload area of the content sharing window 320. In addition, as shown in screen image (c) of FIG. 5, when the uploaded content is transmitted to the first electronic device 101, a message 550 informing that the content has been sent to the second electronic device 106 is displayed on the display 185. According to another embodiment, when the uploaded content is transmitted to the first electronic device 101 and the auxiliary electronic device 104 receives a notification stating that the content has been successfully transmitted to the second electronic device, from the first electronic device 101, a message 550 showing that the uploaded content has been transmitted to the second electronic device 106 is displayed on the display 185.

Figure 6:
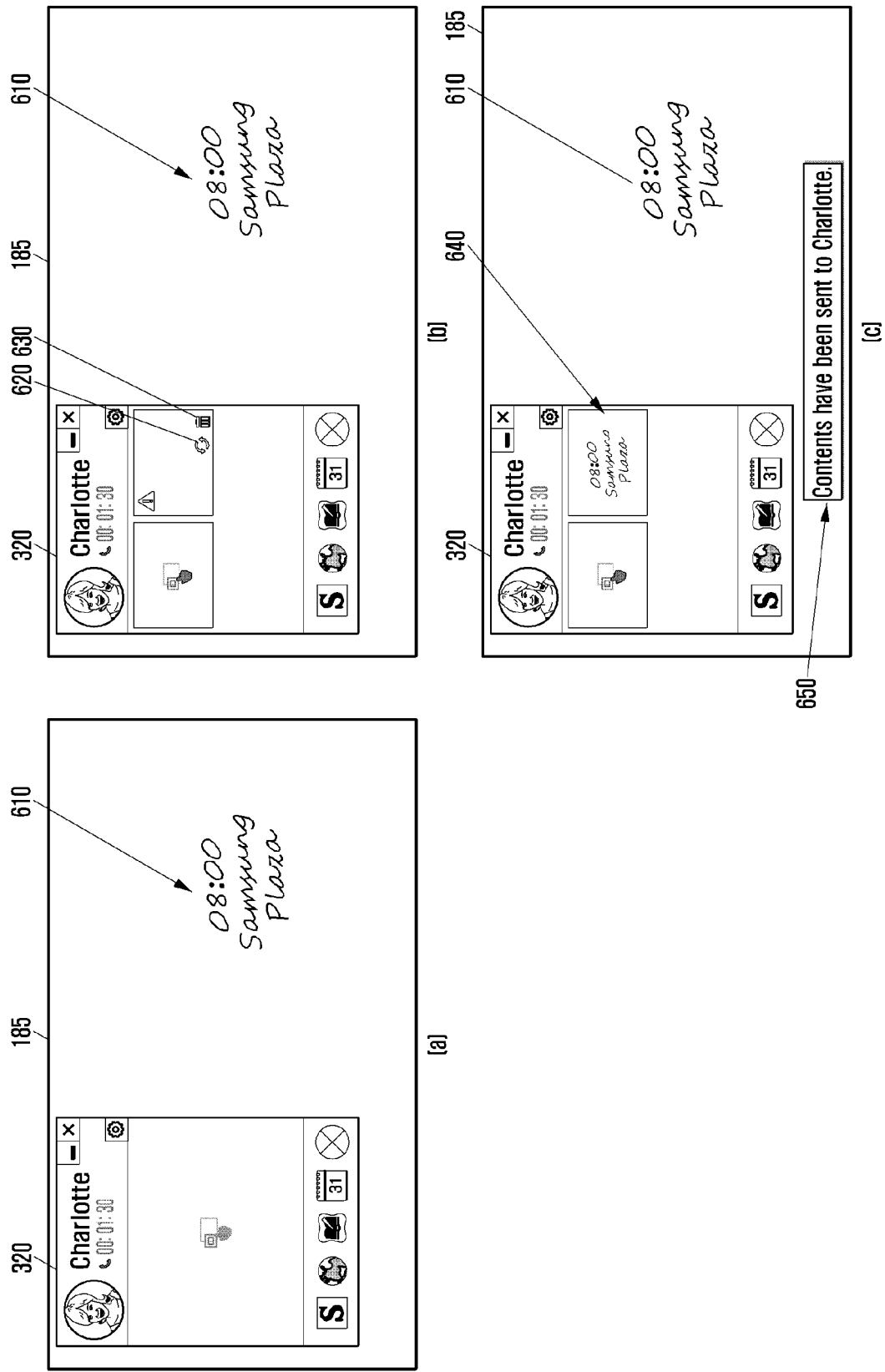
FIG. 6 illustrates screen images showing a method of uploading the content into a content sharing window, according to an embodiment of the present invention.

FIG. 6 illustrates screen images showing a method of uploading the content in the content sharing window 320, according to an embodiment of the present invention.

Referring to screen image (a) of FIG. 6, the user provides an input for uploading the memo content 610 into the content sharing window 320. If the user fails to upload the content because of errors in the auxiliary electronic device 104 or the network, referring to screen image (b) of FIG. 6, the auxiliary electronic device 104 provides a retry icon 620 and a cancellation icon 630 in an area corresponding to the content upload of the content upload area. When the user makes an input into the retry icon 620, the auxiliary electronic device 104 retries uploading the corresponding memo content. If the content upload is successful as a result of the retried upload, as shown in screen image (c) of FIG. 6, the uploaded content is displayed in the form of thumbnails 640 in the content upload area of the content sharing window 320. In addition, a message 650 stating that the uploaded content has been transmitted to the second electronic device 106 IS output through the display 185.

Figure 7:
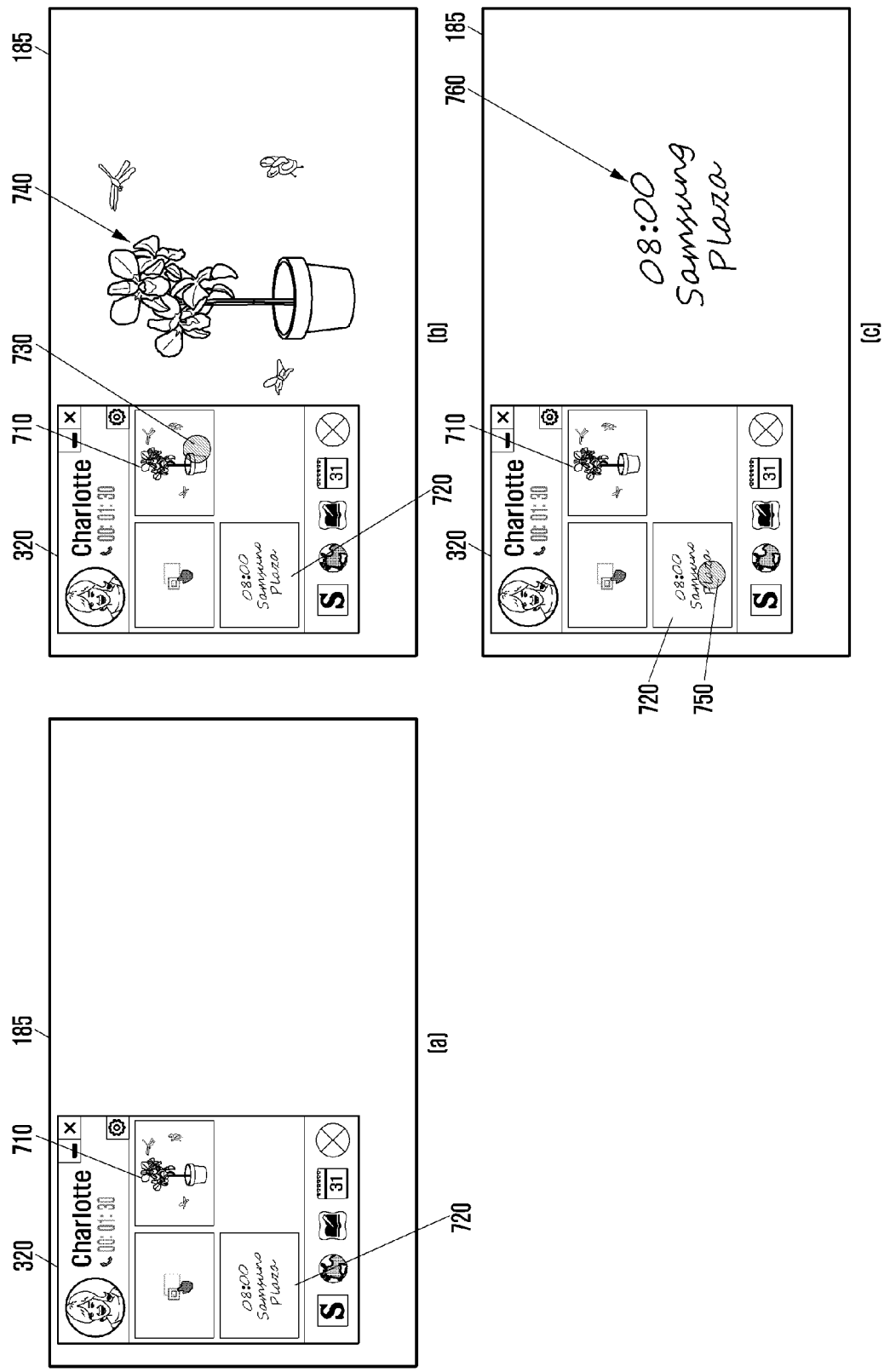
FIG. 7 illustrates screen images showing a method of identifying the content uploaded in a content sharing window in detail, according to an embodiment of the present invention.

FIG. 7 illustrates screen images showing a method of identifying the content uploaded in the content sharing window 320 in detail, according to an embodiment of the present invention.

Referring to screen image (a) of FIG. 7, the captured image file 170, which may be captured according to the user's manipulation, and the memo file 720 are uploaded into the content sharing window 320. When the user wishes to identify the uploaded content in detail after uploading the content into the content sharing window 320, as shown in screen image (b) and (c) of FIG. 7, the user may select the corresponding content to identify the content in detail. Referring to screen image (b) of FIG. 7, when the captured image file 710 uploaded in the content sharing window 320 is selected the auxiliary electronic device 104 executes a gallery application to display the detailed content of the captured image file 710 on the display. Referring to screen image (c) of FIG. 7, when the memo file 720 uploaded in the content sharing window 320 is selected the auxiliary electronic device 104 executes a memo application to display the detailed content of the memo file 720 on the display.

Figure 8:
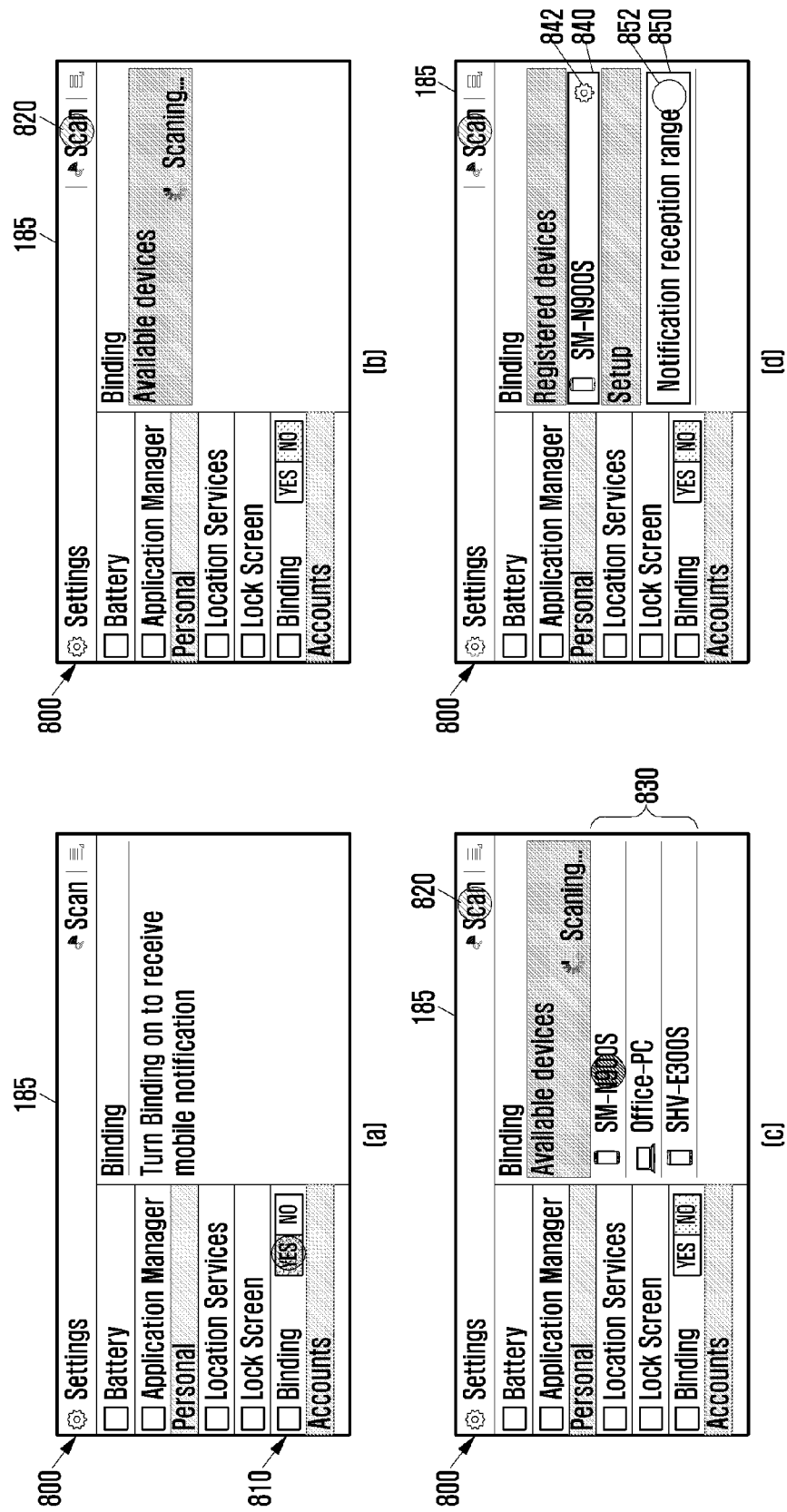
FIG. 8 illustrates screen images showing a method of configuring a content sharing function of an electronic device, according to an embodiment of the present invention.

FIG. 8 illustrates screen images showing a method of configuring a content sharing function of the auxiliary electronic device 104, according to an embodiment of the present invention.

When the user makes an input in the setup button area 322*d* shown in FIG. 3B, a setup menu 810 of the content sharing function is displayed on the display 185 as shown in screen image (a) of FIG. 8. The content sharing function is displayed, for example, using the name "Binding" in the setup menu 810, which is displayed in the manner of executing an integration setup menu 800 of the auxiliary electronic device 104.

As shown in screen image (a) of FIG. 8, when an input for activating the content sharing function is received in the setup menu 810, the auxiliary electronic device 104 activates the content sharing function. As shown in screen images (b) and (c) of FIG. 8, when the user makes an input with respect to an electronic device scan menu 820, the electronic device scans for other electronic devices 830 such as the first electronic devices 101, based on the configured network, and displays the scanning result. The network includes at least one type of network, and may be configured in advance by the user. When an input for selecting any one of the scanned electronic devices 830 is received, the auxiliary electronic device 104 registers the selected electronic device.

As shown in screen image (d) of FIG. 8, the auxiliary electronic device 104 displays the name of the registered electronic device, such as the first electronic device 101, in a registered device display area 840. The registered device display area 840 further includes a setup button 842, which the user may select to execute a setup screen image so that the name of the first electronic device 101 may be changed or deregistered.

The auxiliary electronic device 104 displays other items, such as an item 850 related to a notification reception range. The item includes an item setup button 852. The user may select the item setup button 852 to execute a setup screen image so that the notification reception range may be configured. For example, it may be determined whether the auxiliary electronic device 104 receives all call notifications or only call notifications related to phone numbers registered in the contact information of the first electronic device 101. The details of the setup are provided to the first electronic device 101.

What is claimed is:

1. A method for sharing content of a first electronic device of a user, the method comprising:
   transmitting, when connecting a call with a second electronic device of an opposing party using a first network, a notification on the call connection to a third electronic device of the user that is connected with the first electronic device using a second network; and
   transmitting, when the content is received from the third electronic device during the call, the received content to the second electronic device through a messaging service,
   wherein the first network is different from the second network, and
   wherein the notification is transmitted to the third electronic device in at least one instance of when the call is received from the second electronic device, the call is transmitted to the second electronic device, and the call is connected.

2. The method of claim 1, wherein transmitting the notification comprises transmitting call information including at least one of recipient information, call connection information, call duration information, and related application information.

3. The method of claim 1, wherein the notification is transmitted when user information of the second electronic device is stored in contact information of the first electronic device.

4. The method of claim 1, wherein transmitting the received content comprises at least one of:
   transmitting the received content through the first network; and
   transmitting the received content using user information of the second electronic device, which is stored in the first electronic device, through another network than the first or second network.

5. The method of claim 1, wherein the received content is transmitted through a multimedia messaging service.

6. The method of claim 1, wherein the second network includes a short-range network.

7. A method for sharing content of a first electronic device of a user, the method comprising:
   receiving a notification on a call connection of a second electronic device of an opposing party from a first electronic device through a first network;
   displaying a content sharing window related to the received notification;
   uploading the content into the content sharing window according to a user input; and
   transmitting the content uploaded in the content sharing window to the first electronic device through the first network,
   wherein the second electronic device is connected with the first electronic device using a second network, and
   wherein the first network is different from the second network, and
   wherein the notification is received in at least one instance of when the call is received from the second electronic device, the call is transmitted to the second electronic device, and the call is connected.

8. The method of claim 7, wherein receiving the notification comprises receiving call information including at least one of recipient information, call connection information, call duration information, or related application information.

9. The method of claim 8, wherein displaying the content sharing window comprises:
   displaying, when the notification is received, an icon including the call information; and
   providing the content sharing window when an input with respect to the icon is received.

10. The method of claim 8, wherein the content sharing window includes a call information display area for displaying the call information, and a content upload area for uploading the content, and the content upload area displays the uploaded content in a separated area in sequence.

11. The method of claim 10, wherein the content sharing window further includes a recommended application display area where at least one of the related applications included in the call information or recommended applications configured in the electronic device is displayed, and the method further comprises, when an input for selecting one of the applications displayed in the recommended application display area is received, executing the corresponding application.

12. The method of claim 8, further comprising:
executing an application; and
creating the content from the application,
wherein the content is uploaded as an image file by capturing the image file, or as an original application file.

13. The method of claim 7, further comprising scanning for the second electronic device through the network and preliminarily configuring so that a notification on a call connection of the second electronic device is received.

14. A first electronic device of a user comprising:
a communication interface that makes a connection with a second electronic device of an opposing party through a first network and makes a connection with a third electronic device of the user through a second network; and
a connection control hardware module that transmits, when connecting a call with the second electronic device using the first network, a notification on the call connection to the third electronic device that is connected with the second network, and that transmits, when the content is received from the third electronic device during the call, the received content to the second electronic device through a messaging service,
wherein the first network is different from the second network, and
wherein the connection control hardware module makes a control to transmit the notification to the third electronic device in at least one instance of when the call is received from the second electronic device, the call is transmitted to the second electronic device, and the call is connected.

15. The first electronic device of claim 14, wherein the connection control hardware module makes a control to transmit call information including at least one of recipient information, call connection information, call duration information, or related application information to the third electronic device.

16. A first electronic device of a user comprising:
a communication interface that connects the first electronic device to a second electronic device through a first network;
a content sharing control hardware module that makes a control to receive a notification on a call connection of the second electronic device of an opposing party from the first electronic device through the first network, display a content sharing window related to the received notification, upload the content into the content sharing window according to a user input, and transmit the content uploaded in the content sharing window to the first electronic device through the first network; and
a display that displays the content sharing window and the content,
wherein the second electronic device is connected with the first electronic device using a second network, and wherein the first network is different from the second network, and
wherein the notification is received in at least one instance of when the call is received from the second electronic device, the call is transmitted to the second electronic device, and the call is connected.

17. The first electronic device of claim 16, wherein the content sharing control hardware module further makes a control to receive call information including at least one of recipient information, call connection information, call duration information, or related application information.

18. The first electronic device of claim 17, wherein the content sharing control hardware module further makes a control to display an icon including the call information when the notification is received, and display the content sharing window when an input with respect to the icon is received.

19. The first electronic device of claim 17, wherein the content sharing window includes a call information display area for displaying the call information, and a content upload area for uploading the content, and the content upload area displays the uploaded content in a separated area in sequence.

20. The first electronic device of claim 16, wherein the content sharing control hardware module makes a control to execute an application, create the content from the application, upload the content as an image file by capturing the same, or upload the content as an original application file.

21. The first electronic device of claim 16, wherein content sharing control hardware module scans for the second electronic device through the network and preliminarily configures so that a notification on a call connection of the second electronic device is received.

* * * * *